United States Patent
Filippini et al.

(10) Patent No.: US 8,040,948 B2
(45) Date of Patent: Oct. 18, 2011

(54) METHOD AND SYSTEM FOR CODING MOVING IMAGE SIGNALS, CORRESPONDING COMPUTER PROGRAM PRODUCT

(75) Inventors: Gianluca Filippini, Lodi (IT); Bruno Biffi, Codogno (IT); Fabrizio Simone Rovati, Cinisello Balsamo (IT); Emiliano Piccinelli, Cavenago di Brianza (IT)

(73) Assignee: STMicroelectronics S.r.l., Agrate Brianza(MB) (IT)

( * ) Notice: Subject to any disclaimer, the term of this patent is extended or adjusted under 35 U.S.C. 154(b) by 1516 days.

(21) Appl. No.: 11/448,586

(22) Filed: Jun. 6, 2006

(65) Prior Publication Data

US 2006/0291567 A1    Dec. 28, 2006

(30) Foreign Application Priority Data

Jun. 6, 2005   (EP) ..................................... 05425407

(51) Int. Cl.
*H04N 7/12* (2006.01)
(52) U.S. Cl. ......... 375/240.13; 375/240.12; 375/240.01; 375/240.16; 375/240.17
(58) Field of Classification Search ............ 375/240.13, 375/240.12, 240.01, 240.16, 240.17
See application file for complete search history.

(56) References Cited

U.S. PATENT DOCUMENTS

| | | | |
|---|---|---|---|
| 4,890,160 A | 12/1989 | Thomas | |
| 6,470,050 B1 | 10/2002 | Ohtani et al. | |
| 7,075,988 B2 * | 7/2006 | Lee et al. | ................. 375/240.16 |

FOREIGN PATENT DOCUMENTS

GB    2 187 059 A    8/1987

OTHER PUBLICATIONS

Chan Y-L et al., "Reliable block motion estimation through the confidence measure of error surface", Signal Processing, Amsterdam, NL, vol. 76, No. 2, Jul. 1999, pp. 135-146.
Partial European Search Report for EP 05 42 5407 dated Oct. 10, 2005.

* cited by examiner

*Primary Examiner* — Jay Au
*Assistant Examiner* — Geepy Pe
(74) *Attorney, Agent, or Firm* — Lisa K. Jorgenson; Kevin D. Jablonski; Graybeal Jackson LLP

(57) ABSTRACT

A moving-image signal, such as typically a luminance signal organized in blocks of pixels is coded via a technique that envisages the steps of: comparing a block to be coded with a plurality of candidate prediction blocks; determining, for each candidate prediction block, a respective value of an index representing the difference between the block to be coded and each candidate prediction block; and choosing between the candidate prediction blocks, as a function of the respective value of the aforesaid index, a prediction block to be used for coding of the block to be coded. The signal is sampled pixel by pixel on the block to be coded and on the plurality of candidate prediction blocks, thus generating respective surfaces representing the pattern of the signal in the block to be coded and in the candidate prediction blocks. Chosen as an index is an index of the parallelism between the aforesaid respective surfaces.

16 Claims, 13 Drawing Sheets

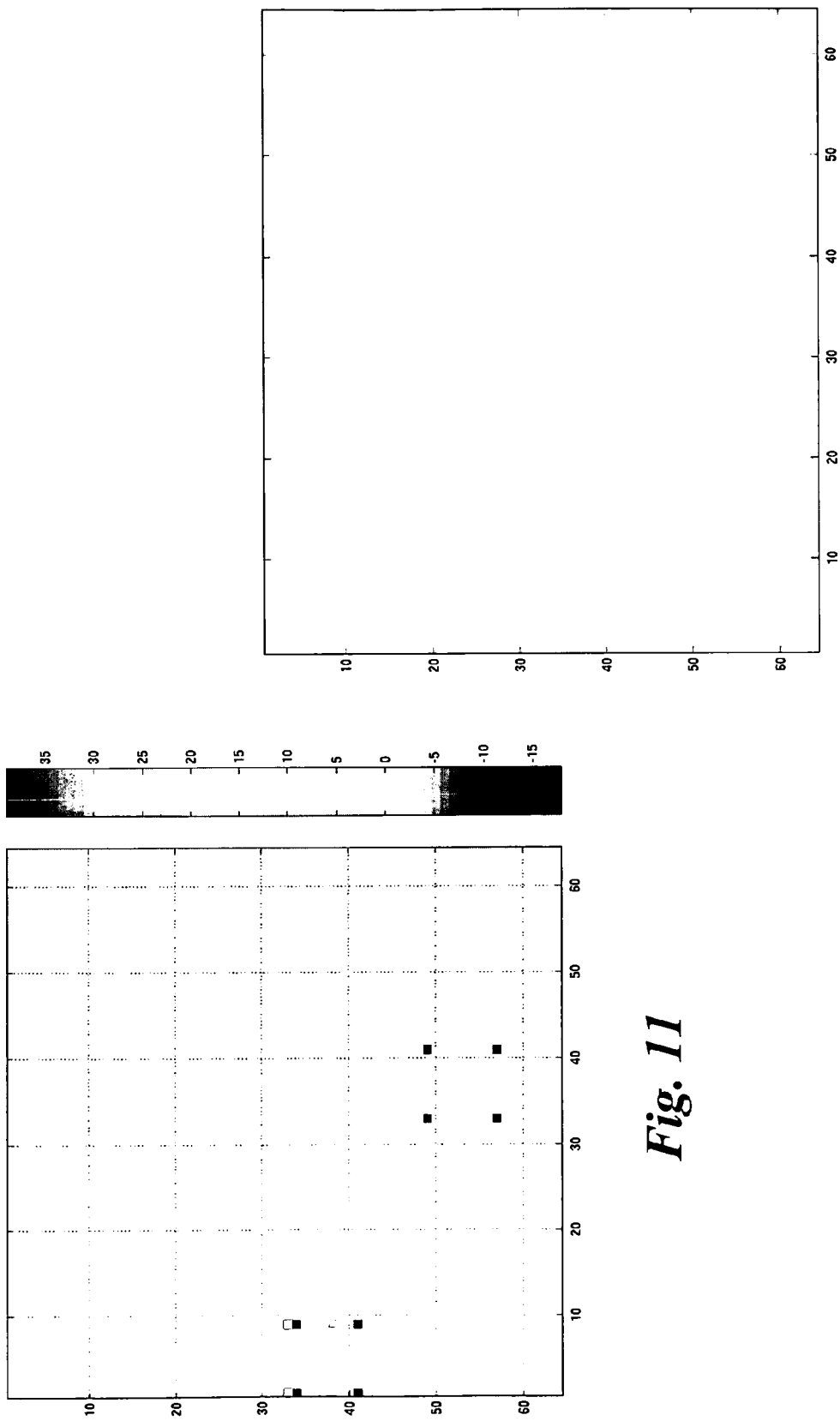

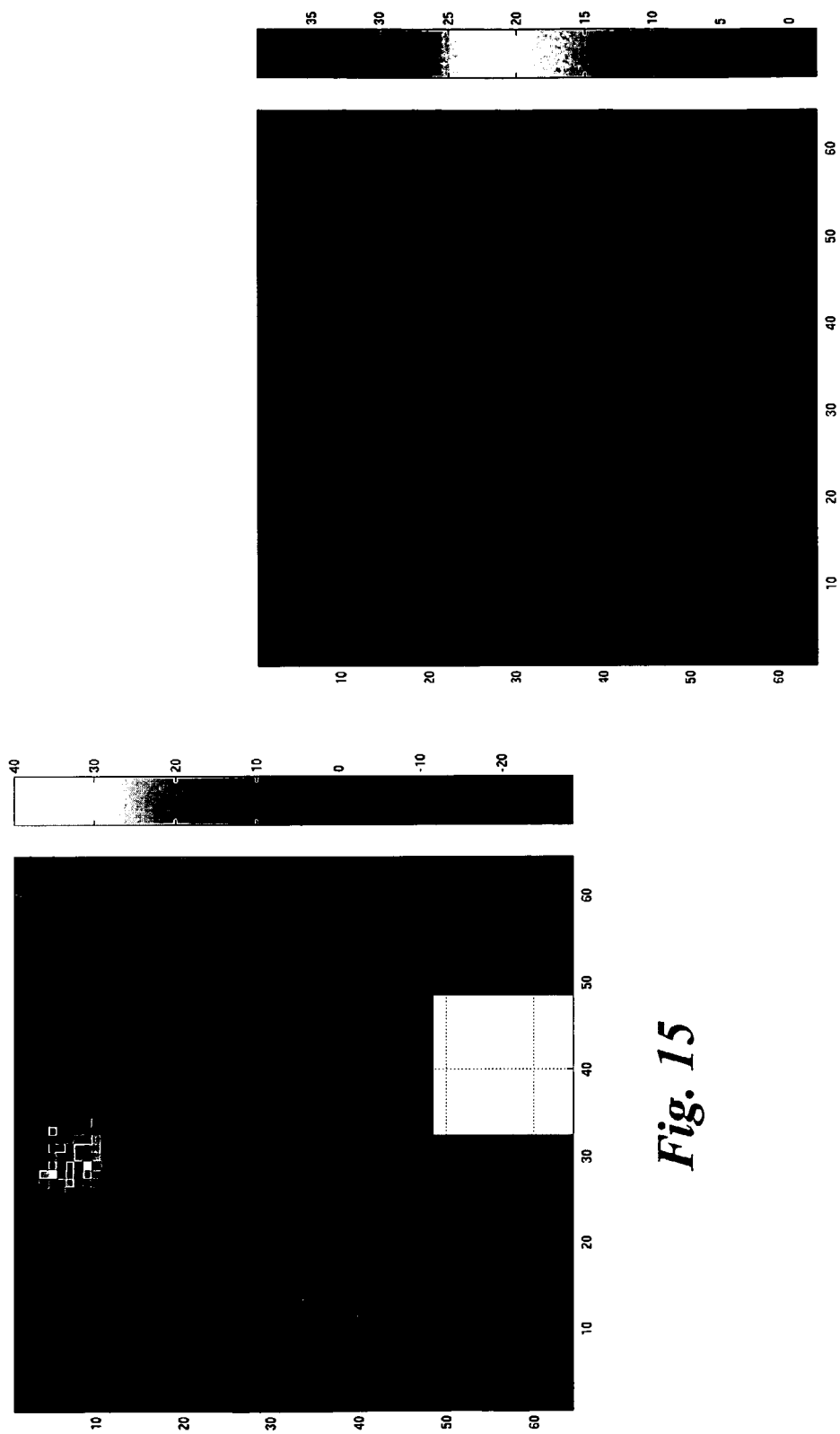

METHOD AND SYSTEM FOR CODING MOVING IMAGE SIGNALS, CORRESPONDING COMPUTER PROGRAM PRODUCT

PRIORITY CLAIM

This application claims priority from European patent application No. 05425407.3, filed Jun. 6, 2005, which is incorporated herein by reference.

TECHNICAL FIELD

An embodiment of the present disclosure relates to techniques for coding (compression) of signals corresponding to moving images and has been developed with particular attention paid to its possible use in transcoding and video coding.

BACKGROUND

Prevalent in the panorama of techniques for compression of moving images is the set of methods that implement a compression of a "block-based" type, i.e., of a type based upon blocks of pixels that make up a photograph or a frame of a video image. Belonging to this set are standards such as MPEG-1, MPEG-2, MPEG-4 and the more recent H.264.

The principles underlying the structure of the above techniques are:
reduction of temporal redundancy; and
reduction of spatial redundancy of image sequences (or photographs or frames) to be coded.

To achieve these two targets, the procedure of digital-image processing involves a long step for estimation of the motion of the individual blocks forming each frame. From extraction of the motion field there derive one or more reference images, which are used to obtain a difference signal, i.e., the part of information useful for coding the frame to be compressed.

The useful information is further optimized by exploiting passage from the space-time domain (luminance and chrominance of the pixels), to the frequency-time domain, by means of the two-dimensional discrete cosine transform (DCT-2D) together with the quantization with a limited number of bits.

The final part of the encoder constructs the bit stream by manipulating the data sequence obtained, using "classic" variable-length coding (VLC) techniques, such as, for example, Huffman coding and the more advanced CAVLC (Context-Adaptive VLC) or CABAC (Context-Adaptive Binary Arithmetic Coding) of the H.264 standard.

Underlying all the techniques in question is the search for the motion field, carried out by means of a technique of so-called "block matching". Irrespective of the type of procedure (with exhaustive search, recursive search or pyramidal search, whether on a spatial basis or on a temporal basis), the encoder makes a choice for selecting a "predictor" block starting from a group of candidate predictor blocks contained within a pre-defined search area. Coding of a macroblock of a P (predicted) type in the MPEG-2 technique is an example thereof.

We shall now refer to FIG. 1, which can be considered to all effects as a block diagram of an encoder system for signals corresponding to moving images.

A macroblock 10 to be coded (for example, a set of 16×16 pixels) is compared in a comparison block 15 with one or more predictor macroblocks 20 in order to choose the best from among the latter, and then use it as reference for the calculation of the difference signal 30. The problem of motion estimation is thus reduced to the problem of estimation of the best predictor, i.e., estimation of the macroblock 20 that minimizes the difference signal 30 computed between the macroblock to be coded 10 and the predictor macroblock 20 identified.

The term "macroblock" designates the minimum motion-compensation unit (linked to at least one motion vector) irrespective of the specific compression standard used. For clarity and simplicity of illustration, reference is here made—by way of example—to the MPEG-2 standard, where the macroblock unit, of a size of 16×16 pixels, carries motion information, and is in turn split into four blocks (of a size of 8×8 pixels) applied to which is an 8×8-pixel-based DCT-2D.

There exist in the literature a number of measurement indices universally adopted as reference for the choice of the best predictor block.

The most important indices are the following:
mean square error (MSE);
mean absolute error (MAE);
sum of absolute differences (SAD); and sum of absolute differences with addition of a Hadamard transform (SATD).

The latter two indices are used by the H.264 standard and are present in the coding issued by the Joint Video Team (JVT). Said indices present similar levels of performance, with a higher efficiency of the SATD index in cases of luminance with spectral content concentrated at low frequencies.

Once the measurement index to be used has been defined, the technique for estimating the best predictor is conceptually simple: the measurement index is applied on the current block and on the candidate predictor block (SAD is assumed for simplicity), and the operation is repeated with all the possible candidate blocks indicated by the motion-estimation technique.

For example, with reference to FIG. 1, using an exhaustive search of the motion (full search), all the possible occurrences are tested between the current block 10 (to be coded) and all the blocks 20 contained within a pre-defined search window that identifies a pre-defined area within reference images or the reference images that are contained in a purposely provided memory buffer 50. The number of possible cases also depends upon the precision adopted by the standard for the motion vectors: in MPEG-2 the sub-pixel estimation is stopped at half a pixel, in H.264 it is stopped at one quarter of a pixel (and with some particular modalities of weighted prediction even beyond).

The choice of the best candidates is iterative: whenever a test returns a measurement that is better than the previous ones (for example, a lower value, ideally zero, for the SAD index) the block examined is chosen as "optimal" prediction of the current block.

Once again with reference to FIG. 1, once the predictor 20 has been identified, the difference signal 30 with the current macroblock 10 is calculated, after which, in a step 40, the DCT is applied to obtain the coefficients to be quantized and coded in the output bit stream 60.

The binomial motion estimation and block matching is crucial: a valid motion estimator offers the smallest possible number of "best predictor candidates", whilst an efficient technique of block matching enables extraction of the best predictor in order to minimize the number of coefficients of the DCT used for coding the difference signal.

In addition, there cannot be any absolute certainty as regards the best choice: considering each block-matching test, the sequence transform—quantization—VLC for counting the number of bits generated within a block is not carried out each time, and even the marked non-linearity of the entropic coding can lead to a high number of output bits for just a few coefficients that rarely occur.

It is highly likely that a smaller number of coefficients of the DCT that are to be coded is transformed into a smaller number of bits inserted in the final bit stream.

Indices such as SAD and SATD are simple to calculate (they contain only additions) and are easy to apply; in addition, they provide a good confidence interval on the block-matching measurement. However, said indices do not present a symmetrical confidence interval: if a very low SAD is certainly an index of effective resemblance between two blocks, a high SAD does not indicate with equal certainty the total extraneity of the data in question. Measurement indices of this type have the purpose of minimizing the error as a whole and do not take into account how the error is distributed at a spatial level in the difference signal.

SUMMARY

From the foregoing description of the current situation, it emerges that there exists a need for defining solutions capable of treating compression of signals representing moving images in a more satisfactory way as compared to the solutions of the prior art.

More specifically, there exists a need to have available more efficient solutions for carrying out block-matching measurements, with the capacity of identifying in a rapid and equally reliable way both conditions of effective resemblance between two blocks and conditions of total extraneity of the data in question, as well as intermediate conditions between the two extreme situations just considered.

An embodiment of the present disclosure meets the aforesaid need.

According to an embodiment of the present disclosure, a method is provided. Embodiments of the present disclosure also relate to a corresponding system, as well as a computer-program product, loadable into the memory of at least one computer and comprising software code portions for performing the aforesaid method. As used herein, reference to one such computer-program product is understood as being equivalent to reference to a computer-readable medium containing instructions for controlling a computer system for the purpose of co-ordinating execution of the method. Reference to "at least one computer" is intended to highlight the possibility for an embodiment of the present disclosure to be implemented in a distributed and/or modular way.

An embodiment described herein hence falls within the category of techniques that enable coding of a moving-image signal organized in blocks of pixels via the operations of:
comparing a block to be coded with a plurality of candidate prediction blocks;
determining, for each candidate prediction block, a respective value of an index representing the difference between a block to be coded and said each candidate prediction block (similarity index); and
choosing from among said candidate prediction blocks, as a function of the respective value of said index, a prediction block to be used for coding said block to be coded.

An embodiment of the disclosure envisages the operations of:
considering said signal pixel by pixel on said block to be coded and on said plurality of candidate prediction blocks as sampling of respective surfaces in a 3D space representing the pattern of said signal in said block to be coded and in said plurality of candidate prediction blocks; and choosing, as said index, an index of the parallelism between said respective surfaces.

In brief, an embodiment described herein seeks the best estimation considering the distribution of the differences pixel by pixel to determine the degree of parallelism between the two surfaces generated by the current block and by the candidate predictor block. Surfaces with a high degree of parallelism can be well predicted but for a d.c. offset that determines the distance between all the points sampled. This new estimation enables the search for predictor blocks even between blocks with an average luminance that is very different from that of the current block, widening the number of favorable cases for the purposes of the final coding.

The degree of parallelism between two surfaces is suited to being measured according to different criteria so that the scope of the present disclosure must not be considered limited to a specific measurement criterion. In any case, whatever the criterion adopted, it should always be possible to establish an index that enables a decision to be made as to whether a given surface is more or less parallel than another with respect to a reference surface.

Consider, for example, using a cartesian reference system x, y, z to express, as values along the axis z, the values of luminance of the pixels of an image signal, each pixel being identified by a pair of values x and y. The overall result of such a representation is that the set of the values of luminance can be viewed as one of the two curves represented in FIG. 2, where the axis z represents the vertical co-ordinate.

The two curves of FIG. 2 are perfectly parallel to one another in so far as each of them can be considered as obtained from the other by a simple translation (offset) along the axis z.

In other words, the difference between the values z between one surface and the other is constant over all the pixels and equal to the offset value, indicatively represented as 10 (in arbitrary units) in FIG. 2.

Assume then that we detect (for example, in the form of a histogram) the distribution of the aforesaid differences for all the pixels, counting for each difference value the number of pixels for which a given difference of value z between the two surfaces is detected.

In the case represented of two perfectly parallel surfaces, said distribution has a zero value for all the possible values of displacement along the axis z, with the exception of the offset value (equal to 10, in the example illustrated). For said offset value the distribution presents a "spike" with a value equal to the number of all the pixels comprised in the image considered.

Now suppose that we move away from the ideal case of absolute parallelism represented in FIG. 2 and that we are hence faced with two surfaces obtained from one another not only as a result of a translation along the axis z, but as a result of such a translation accompanied by a certain "deformation" of the surface during translation.

Detecting again in this case the distribution of the aforesaid differences of the values z for all the pixels, by counting for each difference value the number of pixels for which a given difference of value z between the two surfaces is detected, it will be seen that in this case the distribution will no longer be constituted only by a spike at the offset value, but will instead present a peak at the offset value, accompanied by tails or secondary spikes, which identify that there are pixels for which the difference value differs from the offset value. The aforesaid peak will of course have a lower value than that of the single spike in the previous case.

Suppose once again that we move even further away from the ideal case of absolute parallelism represented in FIG. 2 and that we are faced with two surfaces obtained from one another as a result of the superposition of a translation and a deformation in a situation in which during translation the deformation weighs increasingly more than the translation of the surface. As we move away from the ideal case of absolute parallelism, the peak at the offset value tends to be decreasingly important, whereas the tails or secondary spikes, identifying that there are pixels for which the difference value differs from the offset value, become increasingly important, thus increasing the variance of the distribution. If we proceed along the same lines, we arrive at situations in which the translation/offset becomes altogether negligible as compared to the deformation, and the aforesaid peak, nominally localized in the region around the zero of the distribution becomes in effect indistinguishable.

In this general framework, it is in any case always possible, given a certain surface A, to say which of two other surfaces, B or C, is more parallel to A, i.e., establish an order of indices of parallelism. Between the surfaces B and C, the one that is more parallel to A, i.e., the one that has a higher index of parallelism with respect to A, will in fact be the one for which the aforesaid distribution of the differences has a higher peak value (maximum) and/or smaller variance; the two indices in question are in fact equipollent, and are able, if they are both detected, to increase the reliability of the comparison.

BRIEF DESCRIPTION OF THE DRAWINGS

One or more embodiments of the disclosure will be now described, purely by way of non-limiting example, with reference to the figures of the annexed plate of drawings.

FIG. 11 shows the DCT coefficients for FIG. 10 according to an embodiment of the disclosure.

FIG. 12 shows a second example of photogram to be coded according to an embodiment of the disclosure.

FIG. 15 shows the prediction error of the SRS technique according to an embodiment of the disclosure.

FIG. 16 shows the DCT coefficients for FIG. 15 according to an embodiment of the disclosure.

DETAILED DESCRIPTION

Index of Parallelism

As indicated, a solution described herein is based upon the detection of a degree or index of parallelism between two surfaces. Said degree or index of parallelism is suited to being measured according to different criteria, so that the scope of the present disclosure must not be considered limited to a specific measurement criterion. In fact, whatever the criterion adopted, it is anticipated in any case possible to establish an index that enables a decision to be made as to whether a given surface is more or less parallel than another with respect to a reference surface.

Consider, for example, using a cartesian reference system x, y, z to express, as values along the axis z, the values of luminance of the pixels of an image signal, each pixel being identified by a pair of values x and y. The overall result of such a representation is that the set of the values of luminance can be viewed as one of the two curves represented in FIG. 2, where the axis z represents the vertical co-ordinate.

Figure 2:
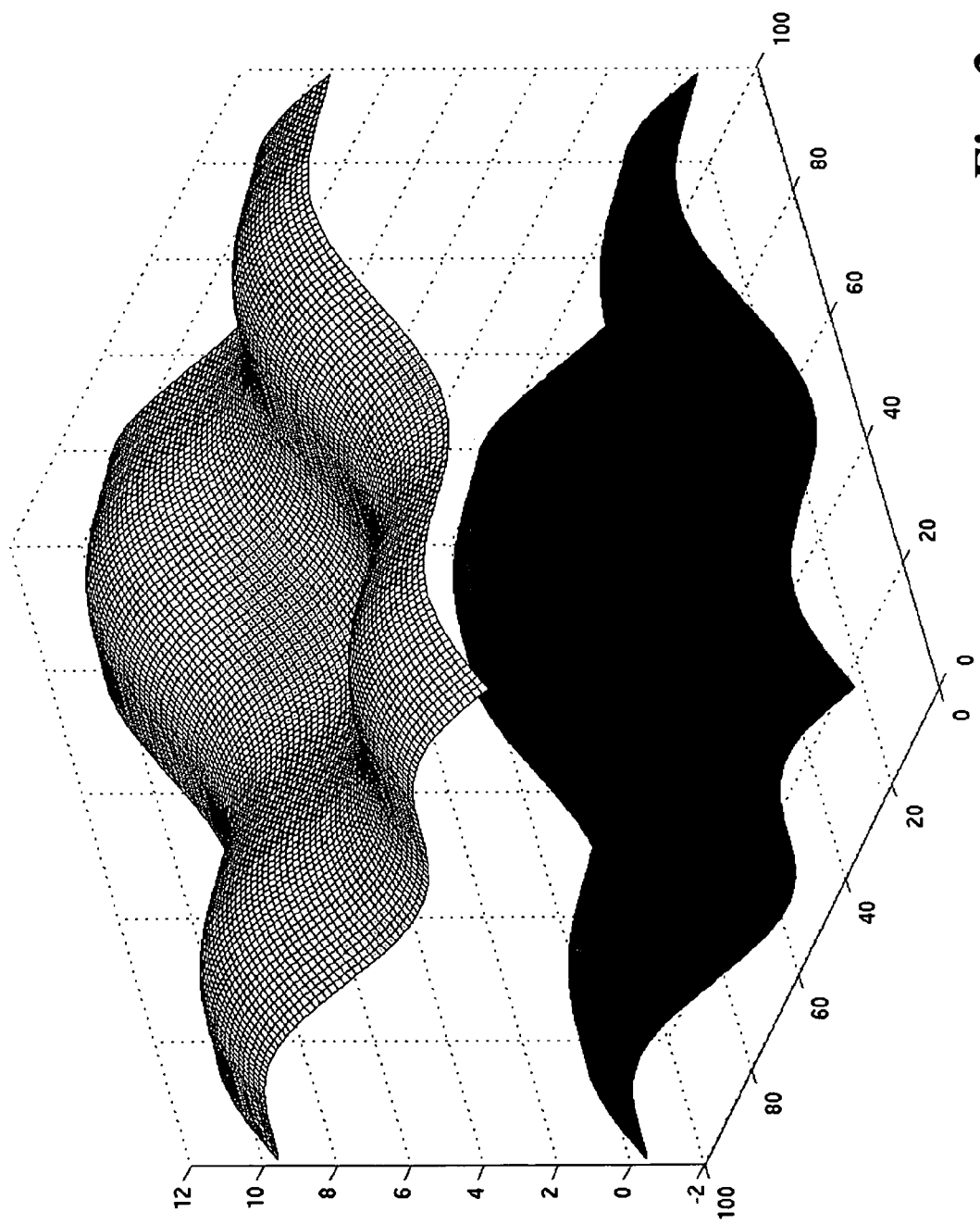
FIG. 2 shows two surfaces of parts of an image having a luminance offset.

The two curves of FIG. 2 are perfectly parallel to one another in so far as each of them can be considered as obtained from the other by a simple translation (offset) along the axis z.

In other words, the difference between the values z between one surface and the other is constant over all the pixels and equal to the offset value, indicatively represented as 10 (in arbitrary units) in FIG. 2.

Assume then that we detect (for example, in the form of a histogram) the distribution of the aforesaid differences for all the pixels, counting for each difference value the number of pixels for which a given difference of value z between the two surfaces is detected.

In the case represented of two perfectly parallel surfaces, said distribution has a zero value for all the possible values of displacement along the axis z, with the exception of the offset value (equal to 10, in the example illustrated). For said offset value the distribution has a "spike" with a value equal to the number of all the pixels comprised in the image considered.

Now suppose that we move away from the ideal case of absolute parallelism represented in FIG. 2 and that we are hence faced with two surfaces obtained from one another not only as a result of a translation along the axis z, but as a result of such a translation accompanied by a certain "deformation" of the surface during translation.

Detecting again in this case the distribution of the aforesaid differences of the values z for all the pixels, by counting for each difference value the number of pixels for which a given difference of value z between the two surfaces is detected, it will be seen that in this case the distribution will no longer be constituted only by a spike at the offset value, but will instead present a peak at the offset value, accompanied by tails or secondary spikes, which identify that there are pixels for which the difference value differs from the offset value. The aforesaid peak will of course have a lower value than that of the single spike in the previous case.

Suppose once again that we move even further away from the ideal case of absolute parallelism represented in FIG. 2 and that we are faced with two surfaces obtained from one another as a result of the superposition of a translation and a deformation in a situation in which during translation the deformation weighs increasingly more than the translation of the surface. As we move away from the ideal case of absolute parallelism, the peak at the offset value tends to be decreasingly important, whereas the tails or secondary spikes, identifying that there are pixels for which the difference value differs from the offset value, become increasingly important, thus increasing the variance of the distribution. If we proceed along the same lines, we arrive at situations in which the translation/offset becomes altogether negligible as compared to the deformation, and the aforesaid peak, nominally localized in the region around the zero of the distribution becomes in effect indistinguishable.

In this general framework, it is in any case anticipated to always be possible, given a certain surface A, to say which of two other surfaces, B or C, is more parallel to A, i.e., establish an order of indices of parallelism. Between the surfaces B and C, the one that is more parallel to A, i.e., the one that has a higher index of parallelism with respect to A, will in fact be the one for which the aforesaid distribution of the differences has a higher peak value (maximum) and/or smaller variance; the two indices in question are in fact equipollent, and are able, if they are both detected, to increase the reliability of the comparison.

As has already been said, the degree or index of parallelism between two surfaces of the type that is of interest here is suited to being measured according to different criteria, albeit, in one embodiment, remaining within the concept of:
  determining the differences of value between the aforesaid respective surfaces, detecting the statistical distribution thereof in terms of number of pixels having a given value difference; and
  attributing to said surfaces an index of parallelism, which is the higher, the more said statistical distribution is concentrated in the region around a single value.

As has been seen, this in practice can be made by attributing to the aforesaid index of parallelism a value that increases as the number of pixels defining the maximum of said statistical distribution increases, and/or decreases as the variance of said statistical distribution increases.

In order to reduce the computational burden, as is preferable for an application of real-time coding, it is possible to resort to simplified solutions as compared to the one described previously, in particular to solutions that envisage splitting-up of the image treated blocks (for example, 16×16 macroblocks) into a set of sub-blocks (for example, four 8×8 blocks). This is followed by a verification, for each sub-block, operating by homologous sub-blocks, of which is the value corresponding to the "peak" of the distribution of the differences pixel by pixel and the corresponding coefficient of variation, then to derive, with an averaging operation, corresponding mean values referring to the entire macroblock. Incidentally, any possible discrepancies between the values obtained for the various sub-blocks are already in themselves good indicators of the fact that the two surfaces each time considered are not parallel to one another. In the ideal case of perfect parallelism (once again with reference to FIG. 2), the offset values calculated for each sub-block are in fact all the same as one another. The fact that the (mean) offset for a sub-block is different from the homologous offset of another sub-block in general indicates that the surfaces, taken over the entire macroblock, are not parallel to one another and that the ideal passage from one to another implies not only a translation, but also a deformation.

Exemplary Embodiments of the disclosure

Figure 1:
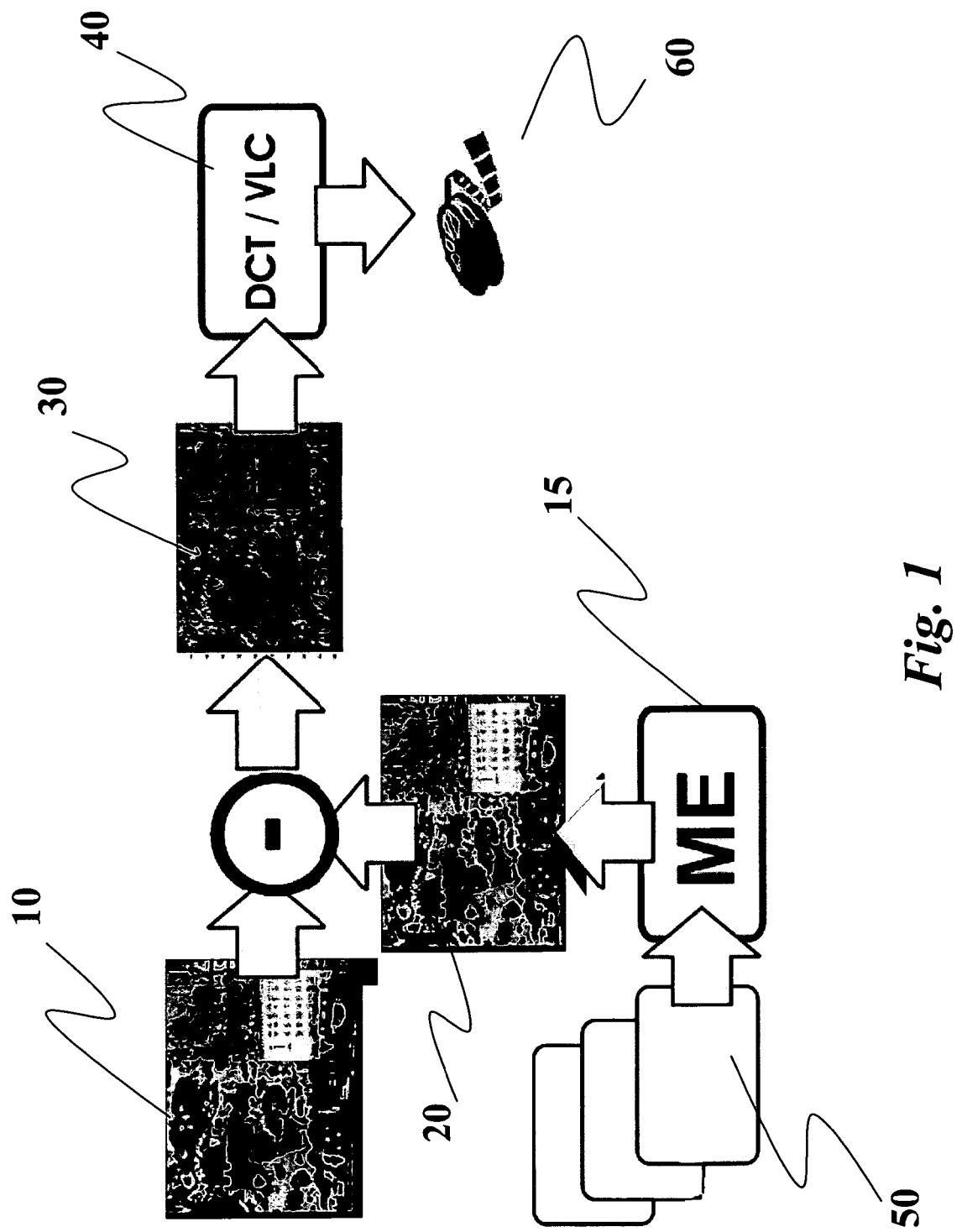
FIG. 1 is a functional block diagram of a conventional system for coding (compression) of signals corresponding to moving images.

The ensuing detailed description stems from the techniques referred to extensively above, in particular in relation to FIG. 1. Said techniques are well known to persons skilled in the sector of image-signal processing, in particular thanks to the knowledge of standards such as MPEG-1, MPEG-2, MPEG-4 or H.264, and this renders superfluous a more detailed introductory treatment herein.

For the present purpose, it will be sufficient to recall that the solution described examines a generic block to be coded (referred to as current block) and considers a signal thereof. This is typically the luminance signal normally adopted for motion estimation and block-matching estimation.

The luminance signal (which expresses the level of grey of an image) is evaluated as the height on the axis z of a diagram like the one illustrated in FIG. 2. It follows that the pixels of the current block constitute a surface sampled in the two-dimensional space, where the sampling grid is formed by the pixel co-ordinates x and y within the image.

Now assume that we have two blocks (B and C, with reference to the example given previously) to be compared with the current block (block A). In particular, assume that, reasoning in terms of luminance of the two blocks B and C, the former, i.e., block B, is similar (with a medium-high value of SAD) to block A, and the latter (block C) is such as to differ only for a fixed offset for all the pixels of the block itself. This identical offset for all the pixels generates a surface parallel to the surface generated by the current block (see FIG. 2).

The case considered above is clearly an ideal case, which however, at least approximately, is found in real cases that arise in normal coding processes. As an example, it is possible to consider coding of regions with a very uniform signal of luminance or parts of an image with "flat", i.e., uniform, colors or else to areas that are the same as one another but with different exposures.

In the conditions described above, a normal block-matching technique will choose as predictor the first block, i.e., block B: the second block, i.e., block C, will have in fact a very high SAD (or SATD) index, given that the luminance offset is replicated over the area (in pixels) of the block. In the subsequent discrete cosine transform of the difference signal thus obtained, the coefficients calculated will have the purpose of correcting more than one frequency in order to be able to compensate the error.

If, however, the measurement index had been able to take into account the fact that the block C differs from the block A only for a difference of offset of luminance, which is the same for all the pixels, it would have chosen as better predictor the second block, i.e., block C, with the considerable advantage of being able to use just one coefficient for transmission of the error signal.

In this connection, the intrinsic meaning of the coefficients of the DCT in block-based coding may be considered: they constitute a signal to be added in the decoding step to the predictor block to obtain once again the current block but for a quantization error.

From an analysis of the aforementioned standard, it may be noted that not all the coefficients have the same level of importance. The DCT DC coefficient is in general coded with a higher number of bits (MPEG-2), or else with particular modalities (Hadamard on four d.c. coefficients in H.264), and consequently has a higher importance than does the remaining part of the frequency spectrum. The reason lies in the empirical laws of human sight, whereby the human eye has a low sensitivity to extensive areas of the high-frequency spectrum.

If the DCT AC coefficients are corrective coefficients, the DCT DC coefficient has another meaning: it is an intrinsic operator of the decoder.

Like the prediction of an "INTRA" type in H.264 coding or the motion-compensation vector, this coefficient is linked in a unique way to an individual decoding operation that alters the mean level of luminance of the block to be decoded. The DC coefficient is always present in each coded block (but for skipped blocks); switching our perspective from a corrective number to a decoding operator enables a new block-matching estimation to be obtained.

An embodiment of the solution described herein adopts, for the estimation of the matching of a block, a measurement technique referred to as statistical resemblance of surface (SRS) based upon the index or degree of parallelism that can be detected between two surfaces in the terms described more fully previously. This technique is useful in the cases where the normal estimations of the SAD and SATD indices do not yield optimal results; namely, considering the estimation as a statistical investigation on the pixel sample, the SAD and SATD indices yield a "false positive".

A principle underlying a method described herein is the spatial analysis of the block-matching measurement. In the normal computation of an SAD (or SATD, MSE) index, the point difference pixel by pixel of the luminance is calculated between the current block and the candidate predictor block; at the end, the value of the measurement is given by the sum of the differences taken as absolute value.

In the majority of cases, it is a consistent estimation, but can be biased by particular spatial distributions of the error. As has been seen previously, a mean offset spread over the entire block can yield a false positive, whilst it is quite evident that this difference could be well recovered with just one coefficient, for example the DC coefficient. It is precisely the availability of this operator that provides the new line of interpretation: the best estimate is sought considering the distribution of the differences pixel by pixel to determine the degree of parallelism between the two surfaces generated by the current block and by the candidate predictor block. Surfaces with a high degree of parallelism can be well predicted but for a DC offset. This new estimation enables the search for predictor blocks even amongst blocks with a mean luminance very different from the current block, widening the number of favorable cases for the purposes of final coding.

An embodiment described herein envisages splitting up a single 16×16-pixel MPEG-2 macroblock into four sub-blocks constituted by quadrants having a size of 8×8 pixels. The size of the block and/or sub-division is evaluated and suggested hereinafter.

As in the normal calculation of the SAD index, on each 8×8 block the differences of luminance pixel by pixel are then calculated.

The main information extracted is the statistical distribution (histogram) of the differences, i.e., the a posteriori probability density, given as experiment the event "difference of luminance values".

Figure 3:
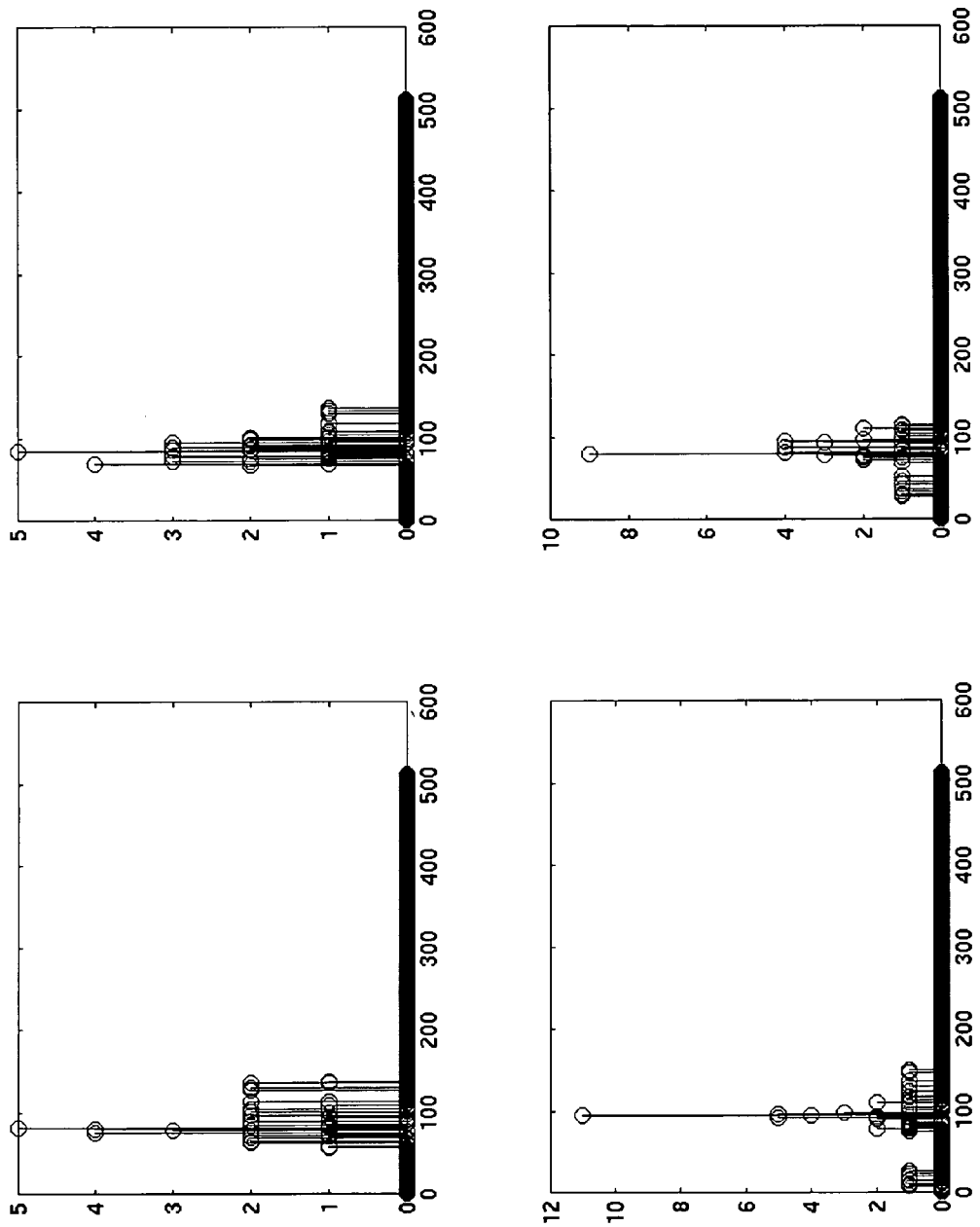
FIG. 3 shows a distribution of a posteriori probability of a macroblock according to an embodiment of the disclosure.

FIG. 3 illustrates four histograms, one for each quadrant of the macroblock, where the axis x gives the difference value found for a given pixel (scale from −255 to +255) and the axis y gives the number of cases found for a given difference value.

From an analysis of the probability graphs of FIG. 3, it is possible to evaluate the degree of parallelism of the two surfaces in question. For each quadrant there is obtained a number of values equal to the area of the block, in the case in point 64. The optimal case is represented by a single spike on the graph, located at a single value of abscissa and having amplitude 64; this would mean that all the 64 pixels of the quadrant are set at a distance apart by an offset equal to the abscissa of the spike.

To be ensured a good coding, the probability densities ought be very concentrated around a maximum having a high value, where said value is as high as possible. The evaluation of some fundamental parameters of the histograms yields an index of resemblance (degree of parallelism) of the surfaces. The greater the index of parallelism, the smaller the number of coefficients that it is likely to be necessary to use to code the difference signal.

The choice of splitting the macroblock into four quadrants is not evidently imperative. The 8×8 size has no relation with the type of DCT used. The dimension of the quadrant is a problem of a statistical type.

Once a technique (namely the index adopted for measuring the degree of parallelism) has been chosen, the minimum dimension of the sample to be used for having an estimate with the desired confidence interval depends upon the size of the images and upon the type of content. Certainly, for a high-definition-television (HDTV) resolution an 8×8 sample may appear to be small, whereas for a common-intermediate-format (CIF) resolution or quarter-common-intermediate-format (QCIF) resolution an 8×8 sample can contain many details of an image (and hence be too large). It is a question of determining the right compromise, in relation to the minimum motion-compensation unit.

The size 8×8 considered in the example embodiment described herein is a compromise between the level of detail and the generality of the index adopted. Using a larger sample, not very indicative results could be obtained because too many values would be averaged, whereas for smaller samples an excessively high number of cases of false positives may be obtained.

Once the histograms of the four quadrants making up the individual macroblock have been obtained, evaluation of said quadrants is performed to extract a single SRS index of parallelism. For each quadrant the following parameters are evaluated:

value of the maximum: i.e., the value of (difference of) luminance most frequent in the quadrant in question (the offset value, in the case of perfect parallelism);

amplitude of the maximum: number of pixels that have the aforesaid value of luminance (equal to 64, in the case of perfect parallelism between two 8×8 quadrants);

centroid: considering the probability-density histogram as a mass distribution, this parameter indicates the value of luminance where the highest number of pixels of the quadrant examined is concentrated; and coefficient of variation: the statistical coefficient of variation of the histogram is linked to the maximum dynamics of luminance of the quadrant.

In practical cases (which differ from the condition of perfect parallelism delineated previously), the measurement consists of the evaluation of the most probable DC offset between its surfaces to be measured (i.e., of the peak of the statistical distribution of the differences), with the addition of a corrective coefficient that takes into account how much the probability density moves away from the ideal condition (single spike in the probability-density histogram).

For example, for the first quadrant we will have:
maximum(1)=max(ddp);
max_pos(1)=pos(max(ddp));
centre(1)=centroid(ddp);

The coefficient of variation is understood as spread along the axis of the abscissa of the distribution obtained:

spread(1)=max(pos(ddp not null))−
min(pos(ddp not null))+1;

whilst the deviation of the centroid is calculated as:

centre_dev(1)=abs(max_pos(1)−centre(1));

The parameter "centre_dev(quadrant)" is an index of how much the probability density is concentrated around the centroid identified. Prior to global evaluation of the quadrant, the value of the maximum is corrected according to the actual offset identified. This correction is referred to as "triangular correction".

maximum(1)=maximum(1)*tri_correction;

The behavior of this corrective multiplying coefficient will be shown hereinafter.

The evaluation on the individual quadrant is made up of three factors (one additive and two subtractive) and is expressed as the weighted contribution of maximum amplitude minus the contribution of the luminance dynamics minus the contribution of the mass concentration:

evalu(1)=maximum(1)*16−((64−maximum(1))*
spread(1))/64−centre_dev(1).

In this way the index of evaluation is obtained for each quadrant as a four-value vector.

It is thus possible to express the SRS index for the macroblock as a whole. As has already been repeatedly said, the condition of perfect parallelism is given by four quadrants having a maximum value of 64 (i.e., all the 64 pixels denote the same luminance offset).

The following quantities are calculated:
the average of the four quadrant evaluations:

srs_mean=mean(evalu);

the coefficient of variation of the quadrant evaluations:

spread=abs((max(evalu)−min(evalu))/4);

the corrective contribution:

correction=(1024−srs_mean)*(spread/1024);

and finally the final SRS value for the MPEG-2 macroblock:

srs_value=srs_mean−correction.

For the final value a total evaluation of the quadrants is made. As a main index, the mean value of the individual evaluations is indicated. A wide variability of the mean values is a negative factor and hence affects the final measurement. As may be noted, the coefficient of variation is weighted in such a way that it is increasingly important, the lower the individual evaluations. It may be stated that a substantial disagreement between the evaluations of the individual quadrants, together with low evaluations (i.e., implicitly, with very low maximum values of probability density) is the worst of the desired configurations. In this case, with a high degree of likelihood, the surfaces in question will not have a good degree of similarity.

Figure 4:
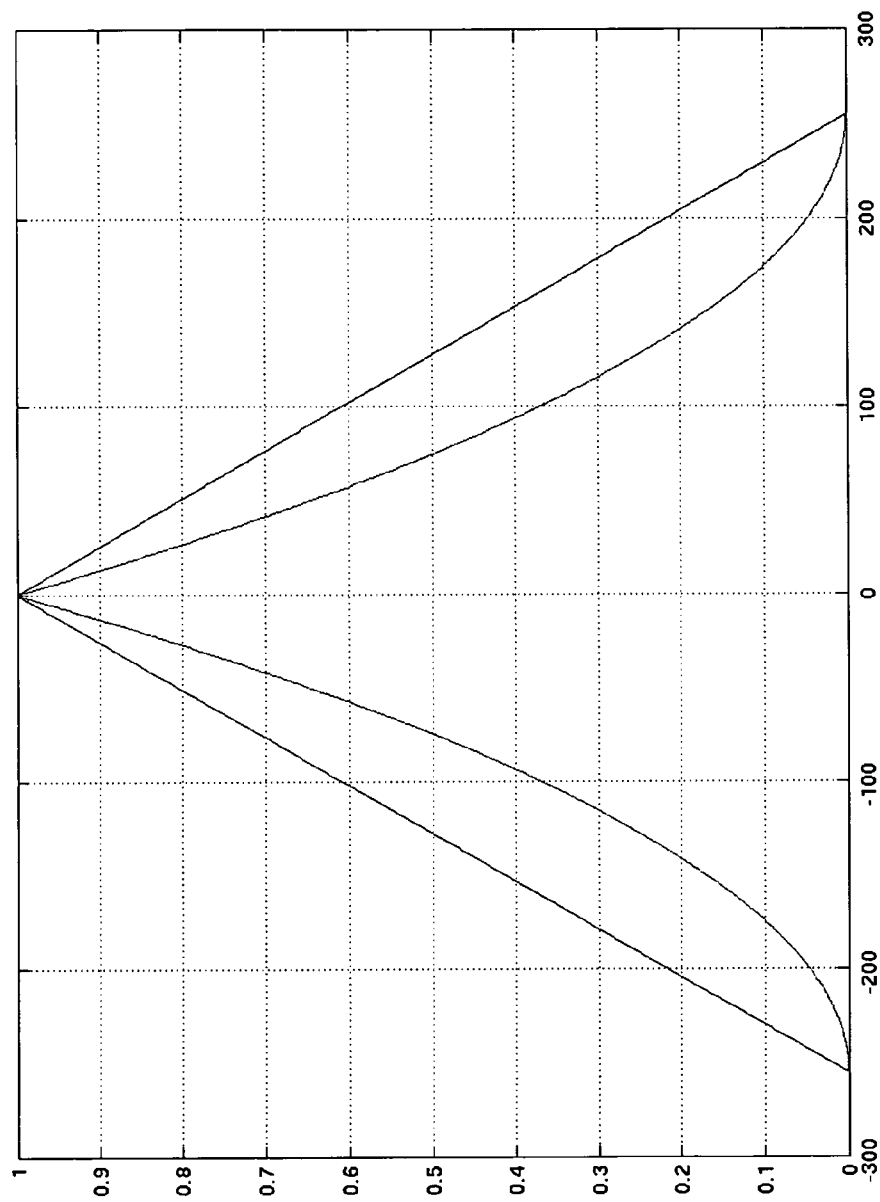
FIG. 4 shows an example of triangular correction according to an embodiment of the disclosure.

The correction made to the maximum value identified in the probability density of each quadrant has, as illustrated in FIG. 4, a triangular pattern basically symmetrical to the vertical axis corresponding the value zero of luminance.

This solution is linked to the type of variable-length coding (VLC) adopted in the MPEG-2 standard. In this standard, the estimation adopted is SAD, and presumably the most frequent values for the DC coefficients are those of a small amplitude; consequently, the VLC tables present in the standard privilege, in terms of bits used, values of small amplitude. The new SRS index mediates between the degree of parallelism of the surfaces and the amplitude of the offset identified between them. It is once again an empirical correction, which brings about a real reduction in the maximum amplitude of the probability density of a quadrant the further this is from the condition of zero offset. It is a multiplying coefficient having a triangular pattern, derived from the good results of the simulations carried out.

The measurement technique presents interesting characteristics because it becomes reliable in the cases where the classic SAD technique yields too high values and hence ones with low reliability. The computational complexity is typically higher as compared to the complexity of calculation of the SAD/SATD indices. A simplified index is consequently proposed, which can maintain a low complexity and a confidence interval greater than that of SAD.

The simplified index will be designated as AC-SAD because the evaluation is based on the value of SAD calculated but for the DC-component offset.

The first step for calculation of the AC-SAD index is identical to the one for calculation of the SRS index: once the macroblock has been split into four quadrants, only the value of probability density of maximum amplitude and the corresponding luminance value is evaluated.

This is the most probable offset for the individual quadrant. By then evaluating the average and coefficient of variation of the four offsets obtained, the DC offset value is calculated for the entire macroblock.

The next step consists of measuring the SAD index on the difference signal but for the offset calculated. In this way, cases of false positives can be prevented in the situations where the classic SAD index fails on account of the presence of very high DC offsets together with parallel surfaces.

The final evaluation of the index envisages correction of the value of the SAD index obtained by means of the triangular factor referred to above, applied to the offset value identified.

Once again, this embodiment arrives at a compromise between an optimal (ideally zero) AC-SAD measurement and a high offset value, in so far as entropic coding (in particular, the MPEG-2 coding) presupposes that DC values of high amplitude will have a low frequency of occurrence, and hence uses for these cases words that are longer in terms of bits.

Two specific cases will now be described, in order to analyze the potentialities of the SRS index proposed.

Figure 6:
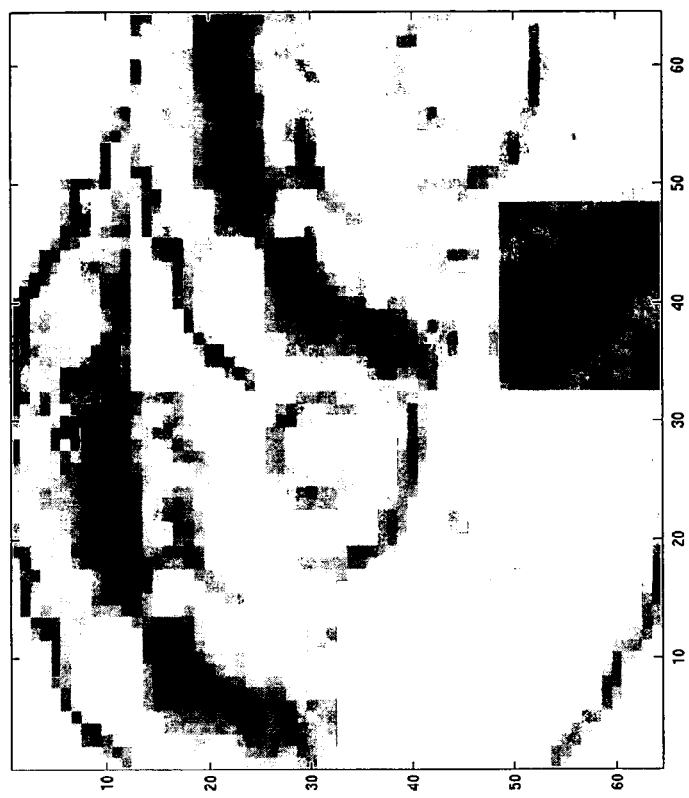
FIG. 6 shows an example of a reference photogram corresponding to the photogram of FIG. 5 according to an embodiment of the disclosure.
Figure 5:
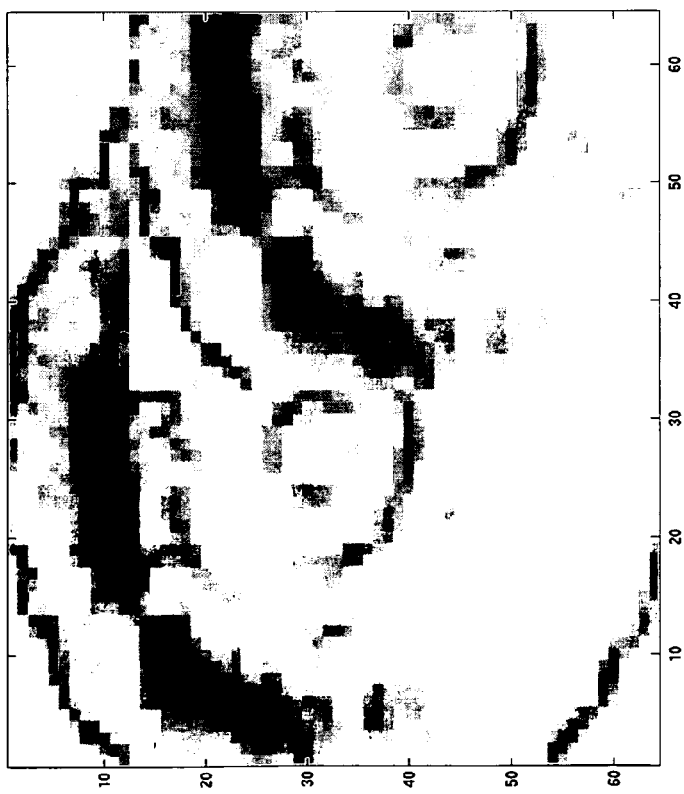
FIG. 5 shows an example of a current photogram to be coded according to an embodiment of the disclosure.

FIG. 5 shows an example of a current photogram, i.e., frame, to be coded. Looking the image, it may be noted how within it the same pattern, of a vaguely circular shape, is replicated twice. Visible in FIG. 6 is a reference frame available in the frame buffer; the aim is to obtain the best prediction of the current image starting from the one available in the frame buffer.

In this specific case, the reference frame is in actual fact obtained from the current one artificially; in fact, it is its exact copy with the addition of minor modifications. In particular, as shown in FIG. 6, a luminance offset has been applied to the macroblock on the bottom right, whilst in the one on the top left the luminance is altered fixing the value to 255 (white).

Furthermore, gaussian noise has been added in the top right part, which is however not very visible in the figure.

There is then performed the full-search motion estimation on entire pixels (to simplify the computational complexity of the example) using the two SAD and SRS indices.

Figure 8:
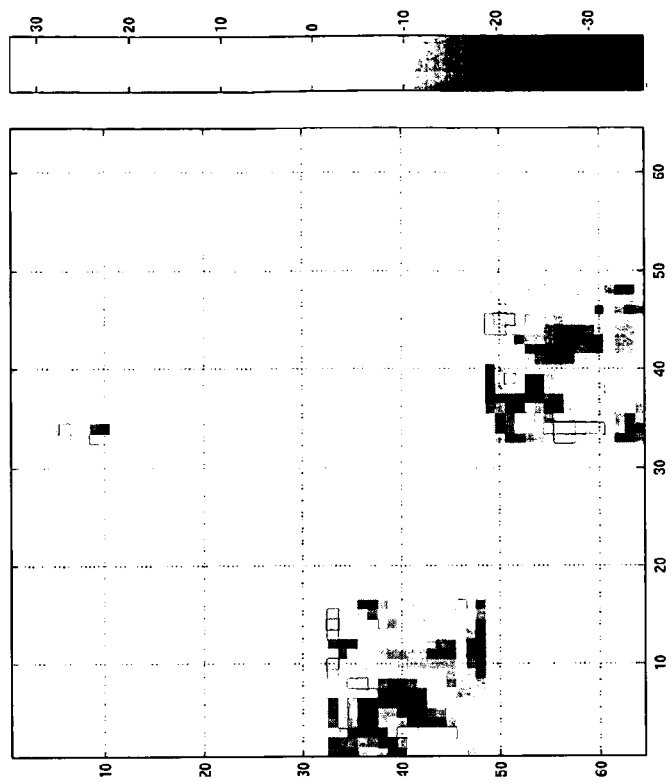
FIG. 8 shows the prediction error of the SAD technique of FIG. 7 according to an embodiment of the disclosure.
Figure 7:
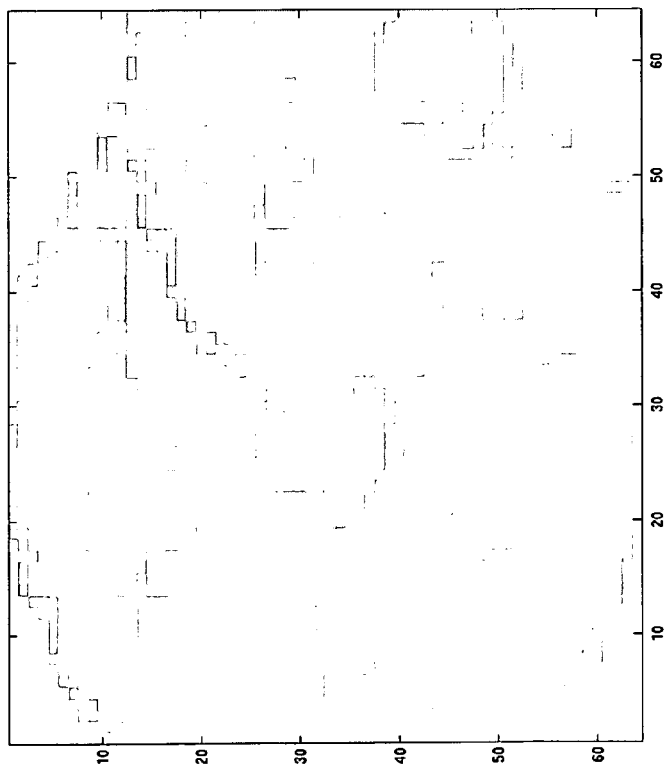
FIG. 7 shows an example of photogram, corresponding to the photogram of FIG. 5, predicted using an SAD technique according to an embodiment of the disclosure.

FIG. 7 shows the result of the block-matching estimation obtained using the SAD index; as may be noted, the index does not recognize that the two altered blocks can be reconstructed perfectly starting from the information replicated in the image, obtaining a considerable prediction error shown in FIG. 8.

Also visible in FIG. 8 is a band caused by the gaussian noise introduced deliberately; in that area the prediction is performed correctly starting from the same area of the image present in the frame buffer.

In order to code the prediction error obtained, by performing an 8×8-based DCT-2D, 144 coefficients are used.

Figure 9:
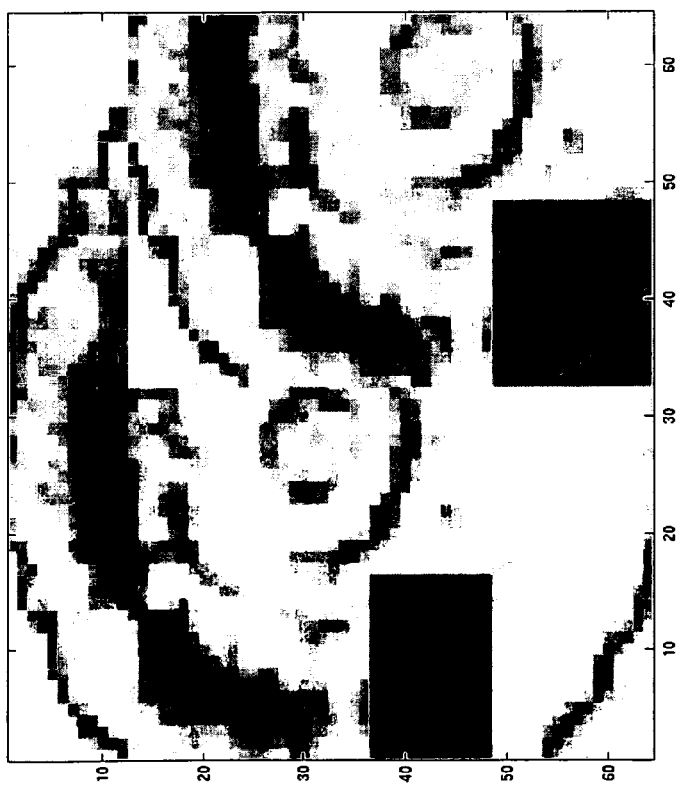
FIG. 9 shows an example of photogram, corresponding to the photogram of FIG. 5, predicted with an SRS technique according to an embodiment of the disclosure.

If the SRS index is used, the two areas are instead identified correctly, as shown in FIG. 9, both on the right-hand part and on the left-hand part, and the prediction error is coded with only 26 coefficients, including the DC values.

Figure 10:
FIG. 10 shows the prediction error of the SRS technique of FIG. 9 according to an embodiment of the disclosure.

In FIG. 10, the top left part that indicates the presence of gaussian noise is predicted in an way identical to the case of the SAD technique. In FIG. 11, the DCT coefficients are not clearly visible in so far as they are not easily representable in the chromatic scale of the figure because their amplitude is very small.

A second case is now presented: the image to be coded denotes an altogether random pattern of luminance, purposely created by means of gaussian noise over all the image.

Visible in FIG. 12 is the image to be coded. The situation in question is frequent in real cases; in fact, it is highly probable that areas of uniform luminance in actual fact will show minor significant variations in the case of high-quality coding. The most common case derives from the noise of acquisition of the source images, which is typically gaussian, for which reason even very uniform tonalities present a slightly variable luminance.

Given the current frame to be coded, the reference frame is constructed artificially as in the previous case, namely two macroblocks with altered luminance (DC offset, white level, and addition of further gaussian noise). Also in this second case, block-matching estimation is performed according to the SAD and SRS indices.

Figure 14:
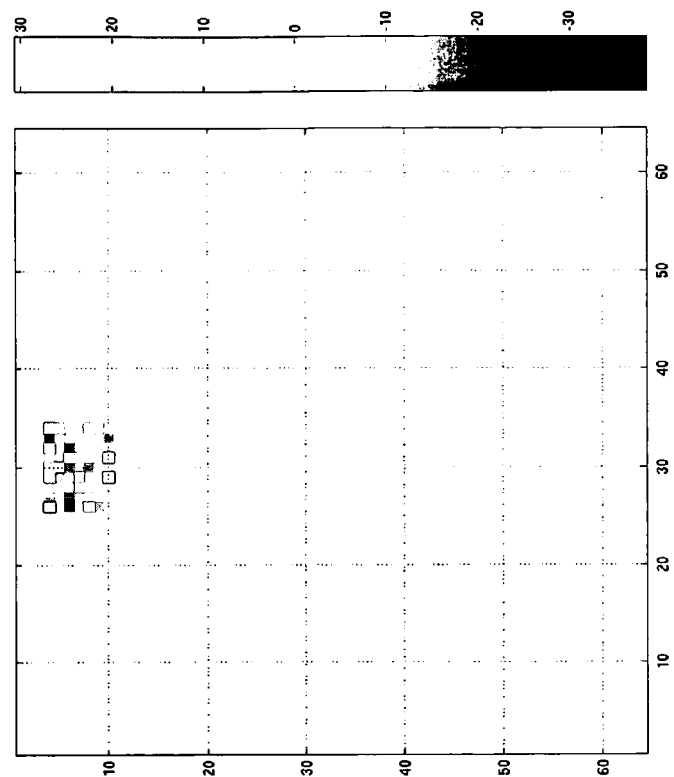
FIG. 14 shows the prediction error of the SAD technique according to an embodiment of the disclosure.
Figure 13:
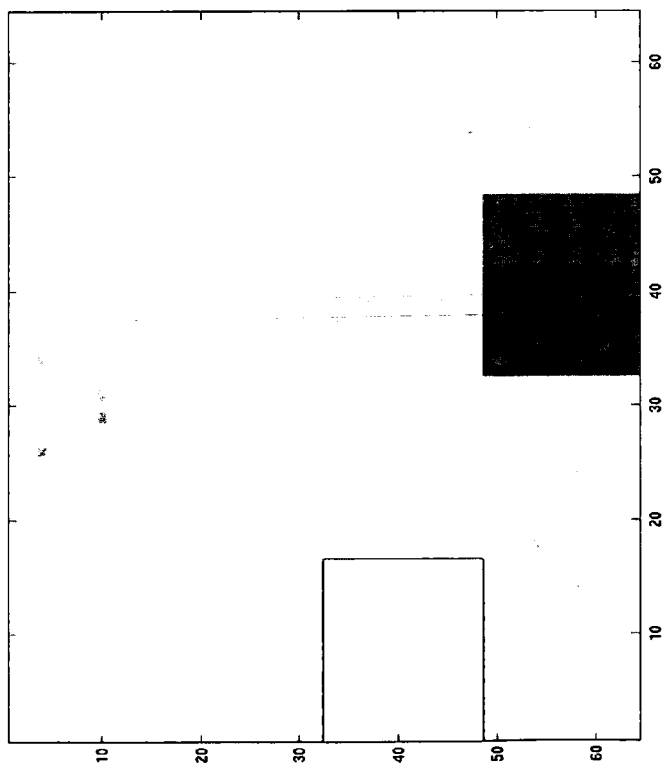
FIG. 13 shows an example of reference photogram corresponding to the photogram of FIG. 12 according to an embodiment of the disclosure.

FIG. 13 shows a reference frame, whilst FIGS. 14 and 15 show the errors of prediction respectively for the two cases of calculation of the SAD index and of the SRS index. FIG. 16, instead, gives the SRS DCT coefficient.

Estimation with the SAD index yields diffuse errors with a large content of high frequencies, since it has to be a global estimation on the entire block. The estimation with the SRS technique detects correctly parallel blocks identical to one another thus using a few DC coefficients in the transmission of the prediction error.

As numerical datum, after the DCT (the quantization is a two-step quantization, given the small variation of luminance, which is equivalent to a high-quality coding), the SAD technique uses 429 coefficients, whilst the SRS technique usually employs 366 coefficients.

Consider now a case of generic coding, which presents anomalous situations of estimation in so far as the main subject of the film performs a movement of rotation and translation in a short time. The sequence is the well known Foreman sequence. Two frames are used here, which are at a distance of two frames apart (a typical case of P image coded starting from the image of type I present in the frame buffer).

Figure 18:
FIG. 18 shows a third example of photogram to be coded according to an embodiment of the disclosure.
Figure 17:
FIG. 17 shows an example of reference photogram corresponding to the photogram of FIG. 18 according to an embodiment of the disclosure.
Figure 20:
FIG. 20 shows an enlargement of the photogram of FIG. 19 according to an embodiment of the disclosure.
Figure 19:
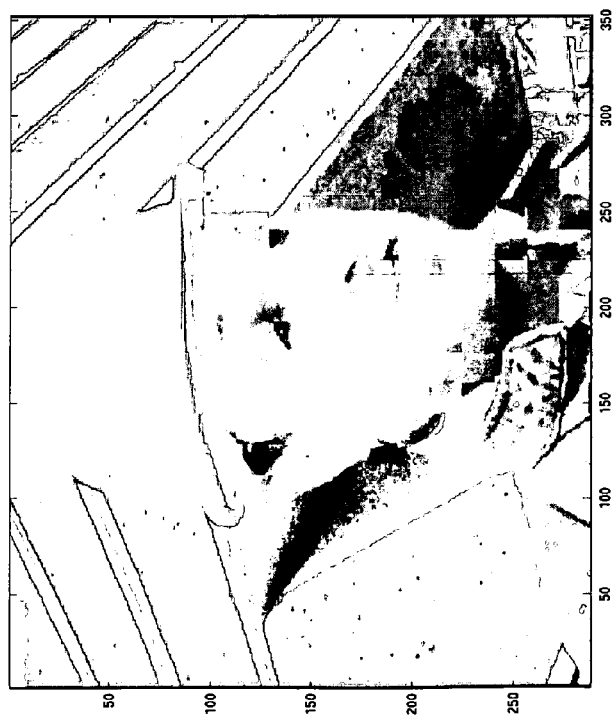
FIG. 19 shows an example of photogram reconstructed with the SAD technique according to an embodiment of the disclosure.
Figure 22:
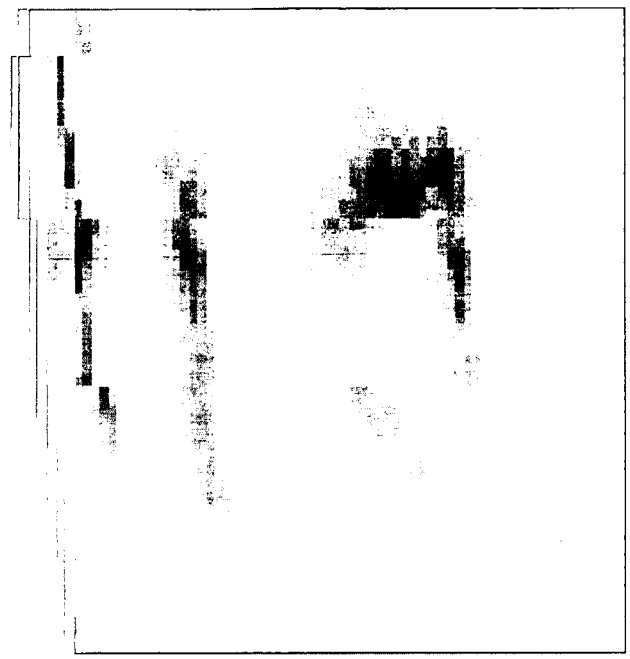
FIG. 22 shows an enlargement of the photogram of FIG. 21 according to an embodiment of the disclosure.
Figure 21:
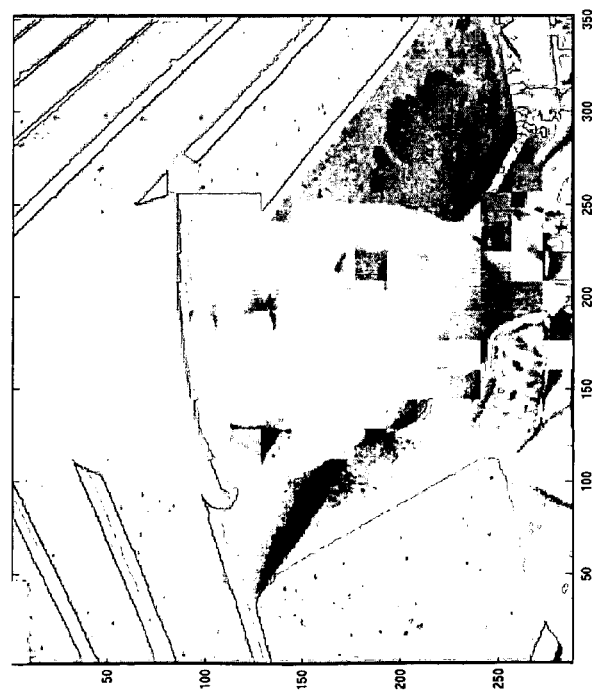
FIG. 21 shows an example of photogram reconstructed with the SRS technique according to an embodiment of the disclosure.

FIG. 18 shows an image to be coded, whilst FIG. 17 represents a reference image contained in the frame buffer of the encoder. The critical areas are those corresponding to the face that changes position and orientation, whilst the background performs a slight panning movement. Block-matching analysis by means of SAD leads to the coding of 10122 DCT coefficients (with a quantization step equal to 8). Using said metrics, some false positives are found: for example, the right eye of the subject (open in the reference frame, closed in the frame to be coded) is estimated with the block located where the eye is open. The mean error of luminance is in fact comparable on account of the dark areas present.

If the SRS index is used, an estimation is obtained resembling more closely the real configuration of the eye. In the coding of generic images, the SRS estimation behaves in a complementary way with respect to the SAD estimation, i.e., there may occur false positives where the SAD is in general efficient. This is the case of areas with "flat" tonalities (the white hat, for example) with uniform luminosity.

It proves efficient to use a combined SAD+SRS method for block-matching estimation, combining the advantages of computational complexity of the SAD with the advantages of estimation of the distribution of the error in the case where the value of the SAD has a low reliability. Using the joint estimation with a decision threshold corresponding to a SAD value of 600 (which indicates that, if there are no SAD values below the reliability threshold, the estimation is performed using SRS) the error signal to be coded requires 10011 DCT coefficients (case SRS+SAD), as against the 10122 coefficients of SAD alone.

It is interesting to note that the gain, albeit not particularly marked, is in any case given by very few blocks corresponding to the rotation of the face of the subject. The panning movement of the background is easy to estimate and does not give rise to any considerable differences between the two indices.

In the simulations with "generic" sequences not constructed artificially to highlight the cases where the method can be exploited, also the measurement with AC-SAD was considered. The index presents an excellent compromise between computational complexity and efficiency, and is convenient from the implementation standpoint in so far as it does not present any decision threshold value. The tests performed are comforting; in the case in point, the error signal to be coded requires 10047 coefficients, thus positioning the AC-SAD index between SAD and SAD+SRS in a hypothetical scale of merit.

The SRS metrics developed finds an important application in systems for transcoding from the MPEG-2 standard to the H.264 standard. In particular, the effectiveness of the SRS technique is highlighted in conversion of images (or parts thereof) coded in INTRA mode.

The MPEG-2 standard uses a linear quantizer markedly different from the one used in H.264 and, moreover, does not possess the spatial prediction modalities that constitute one of the most important characteristics of H.264. Considering the latter as a superset of MPEG-2, it may be stated that MPEG-2 has available only INTRA prediction starting from the ZERO level in the 16×16 mode.

There exist problems regarding the quality of the images that derive from the interaction of the INTRA prediction with the different scales of quantization between the two standards. Even though a translation of the quantization parameters (from Mquant of MPEG-2 to QP of H.264) is possible, in actual fact, it may happen that the parameter QP obtained for a given macroblock is altogether inadequate for maintaining the same level of subjective quality afforded by the MPEG-2 input data stream. The reason lies in the efficient INTRA prediction that H.264 makes of each H.264 macroblock (whether 16×16 or 4×4), at the end of which the effective error signal to be transformed (4×4 DCT) and quantized is altogether different from the input one (MPEG-2). In general, said error signal is highly likely to be rich in high frequencies, since it is the difference with respect to the prediction performed with directional gradients on the basis of the surrounding pixels (i.e., the pixels set around the block in question). In these cases, the static translation of the quantization parameters leads to oversizing the QP parameter for a given bitrate, thus often giving rise to effects of dimming within an individual block/macroblock.

The use of the SRS index enables modulation of the value of the QP obtained by means of static translation from MPEG-2 to H.264, evaluating the degree of parallelism between the surface of the INTRA prediction of H.264 and the surface to be coded (MPEG-2 input).

The SRS metrics proposed for the block-matching estimation used in motion estimators of block-based video encoders affords applicational advantages in the cases where the metrics most commonly used yield results of false positives. The SRS solution affords a computational complexity greater than does the classic SAD metrics, but represents an excellent compromise between complexity and efficiency if it is used in combination therewith adopting a decision threshold.

The SRS index is likewise useful in the applicational case of transcoding from the standard MPEG-2 to H.264.

In addition, the simplified technique (AC-SAD) has a lower complexity than the SRS metrics but a higher efficiency as compared to the SAD metrics.

It will be appreciated that also this variant embodiment bases its operation on the fundamental concept of:
considering said signal pixel by pixel on said block to be coded and on said plurality of candidate prediction blocks as sampling of respective surfaces in a 3D space representing the pattern of said signal in said block to be coded and in said plurality of candidate prediction blocks; and
choosing, as an index representing the difference between the block to be coded and each candidate prediction block, an index linked to the parallelism between the aforesaid surfaces.

A processor may be programmed to execute one or more of the above-described techniques (or similar techniques), and an electronic system, such as computer or video camera, may incorporate such a processor.

Consequently, without prejudice to the principle of the disclosure, the details of construction and the embodiments may vary, even significantly, with respect to what is described and illustrated herein, purely by way of non-limiting example, without thereby departing from the scope of the disclosure.

The invention claimed is:

1. A method for compressing a moving-image organized in blocks of pixels, comprising:
comparing a block to be coded with a plurality of candidate prediction blocks;
determining, for each candidate prediction block, a respective value of an index representing the difference between the block to be coded and each candidate prediction block; and
choosing between said candidate prediction blocks, as a function of the respective value of said index, a prediction block to be used for the coding of said block to be coded, said method further comprising:
considering said signal pixel by pixel on said block to be coded and on said plurality of candidate prediction blocks as sampling of respective surfaces in a 3D space representing the pattern of said signal in said block to be coded and in said plurality of candidate prediction blocks; and
choosing, as said index representing the difference between the block to be coded and each candidate prediction block, an index of the parallelism between said respective surfaces, wherein the index of parallelism is generated from a statistical distribution based upon the differences that includes pixels having a most frequent value, a number of pixels having the most frequent value, a centroidal value corresponding to a selected location of the pixels, and a coefficient of variation.

2. The method according to claim 1, further comprising, in order to calculate said index of parallelism between said respective surfaces, the operations of:
determining, for at least one homologous sub-block of said block to be coded and of each candidate prediction block, the differences of value between said respective surfaces, detecting their statistical distribution in terms of number of pixels having a given difference of value; and
attributing to said respective surfaces an index of parallelism that is the higher, the more said statistical distribution is concentrated in the region around a single value.

3. A method for compressing a moving-image organized in blocks of pixels, comprising:
comparing a block to be coded with a plurality of candidate prediction blocks;
determining, for each candidate prediction block, a respective value of an index representing the difference between the block to be coded and each candidate prediction block; and
choosing between the candidate prediction blocks, as a function of the respective value of the index, a prediction block to be used for the coding of the block to be coded, further comprising:
considering the signal pixel by pixel on the block to be coded and on the plurality of candidate prediction blocks as sampling of respective surfaces in a three-dimensional space representing the pattern of the signal in the block to be coded and in the plurality of candidate prediction blocks; and
choosing, as the index representing the difference between the block to be coded and each candidate prediction block, an index of the parallelism between the respective surfaces including determining, for at least one homologous sub-block of the block to be coded and of each candidate prediction block, the differences of value between the respective surfaces, detecting their statistical distribution in terms of number of pixels having a given difference of value, and attributing to the respective surfaces an index of parallelism that is the higher, the more the statistical distribution is concentrated in the region around a single value, and calculating for the statistical distribution, quantities including the most frequent value, the number of pixels that have the aforesaid most frequent value, the centroidal value where the majority of pixels are concentrated, and the coefficient of variation.

4. The method according to claim 2, further comprising:
attributing to said index of parallelism a value that increases with the number of pixels defining the maximum of said statistical distribution and/or decreases with the coefficient of variation of said statistical distribution.

5. A method for compressing a moving-image organized in blocks of pixels, comprising:
comparing a block to be coded with a plurality of candidate prediction blocks;
determining, for each candidate prediction block, a respective value of an index representing the difference between the block to be coded and each candidate prediction block; and
choosing between the candidate prediction blocks, as a function of the respective value of the index, a prediction block to be used for the coding of the block to be coded, further comprising:
considering the signal pixel by pixel on the block to be coded and on the plurality of candidate prediction blocks as sampling of respective surfaces in a three-dimensional space representing the pattern of the signal in the block to be coded and in the plurality of candidate prediction blocks; and
choosing, as the index representing the difference between the block to be coded and each candidate prediction block, an index of the parallelism between the respective surfaces including attributing to the index of parallelism a value that increases with the most frequent value, on the one hand, and/or decreases with the centroidal value as well as with the coefficient of variation, on the other hand, and determininq, for at least one homologous sub-block of the block to be coded and of each candidate prediction block, the differences of value between the respective surfaces, detecting their statistical distribution in terms of number of pixels having a given difference of value, and attributing to the respective surfaces an index of parallelism that is the higher, the more the statistical distribution is concentrated in the region around a single value, and calculating for the statistical distribution, quantities including the most frequent value, the number of pixels that have the aforesaid most frequent value, the centroidal value where the majority of pixels are concentrated, and the coefficient of variation.

6. The method according to claim 2, further comprising:
splitting said block to be coded and each candidate prediction block into a set of homologous sub-blocks;
attributing to each of said sub-blocks of said set, at least one respective index of parallelism; and
calculating, starting from the respective indices of parallelism attributed to the sub-blocks of said set, a global index of the parallelism between said block to be coded and each candidate prediction block.

7. The method according to claim 6, further comprising the operation of calculating said global index of the parallelism between said block to be coded and each candidate prediction block as a function of the average of said respective indices of parallelism attributed to the sub-blocks of said set.

8. The method according to claim 7, further comprising the operation of reducing said global index of the parallelism between said block to be coded and each candidate prediction block as the differences between said respective indices of parallelism attributed to the sub-blocks of said set increase.

9. The method according to claim 1, further comprising the operations of:

determining, for at least one homologous sub-block of said block to be coded and of each candidate prediction block, the differences of value between said surfaces corresponding to said block to be coded and each candidate prediction block, identifying a deviation offset between said surfaces which is given by a mean value of said differences;
calculating a sum of the absolute differences (SAD) on the basis of said differences of value net of said offset; and
choosing said one prediction block to be used for the coding of said block to be coded, as a function of said sum of the absolute differences net of said offset.

10. The method according to claim 9, further comprising the operations of:
splitting said block to be coded and each candidate prediction block into a set of homologous sub-blocks; and
performing the aforesaid operations for all the sub-blocks of said set identifying respective values of said deviation offset between said surfaces, said values being given by mean values of said differences within each of the sub-blocks of said set.

11. The method according to claim 1, wherein said signal is a luminance signal.

12. The method according to claim 11, wherein said luminance signal is sampled pixel by pixel on two-dimensional image blocks.

13. The method according to claim 1, wherein said block to be coded and said at least one prediction block are chosen as 16×16-pixel macroblocks.

14. The method according to claim 6, wherein said homologous sub-blocks are chosen as 8×8-pixel quadrants.

15. A device for coding a moving-image signal, said signal being organized in blocks of pixels, the device comprising:
a comparison module for comparing a block to be coded with a plurality of candidate prediction blocks; and
a coding chain configured for choosing between said candidate prediction blocks, the device configured to execute a method, further comprising:
comparing a block to be coded with a plurality of candidate prediction blocks;
determining, for each candidate prediction block, a respective value of an index representing the difference between the block to be coded and each candidate prediction block; and
choosing between said candidate prediction blocks, as a function of the respective value of said index, a prediction block to be used for the coding of said block to be coded, said method further comprising:
considering said signal pixel by pixel on said block to be coded and on said plurality of candidate prediction blocks as sampling of respective surfaces in a 3D space representing the pattern of said signal in said block to be coded and in said plurality of candidate prediction blocks; and
choosing, as said index representing the difference between the block to be coded and each candidate prediction block, an index of the parallelism between said respective surfaces.

16. A computer-program product comprising a computer usable medium having a computer-readable program code embodied therein, the computer readable program code configured to be executed to implement the method according to claim 1.

* * * * *